(12) United States Patent
Mizrahi et al.

(10) Patent No.: US 10,185,561 B2
(45) Date of Patent: Jan. 22, 2019

(54) PROCESSOR WITH EFFICIENT MEMORY ACCESS

(71) Applicant: Centipede Semi Ltd., Netanya (IL)

(72) Inventors: Noam Mizrahi, Hod Hasharon (IL); Jonathan Friedmann, Even Yehuda (IL)

(73) Assignee: CENTIPEDE SEMI LTD., Netanya (IL)

( * ) Notice: Subject to any disclaimer, the term of this patent is extended or adjusted under 35 U.S.C. 154(b) by 0 days.

(21) Appl. No.: 14/794,835

(22) Filed: Jul. 9, 2015

(65) Prior Publication Data

US 2017/0010892 A1   Jan. 12, 2017

(51) Int. Cl.
*G06F 9/30*    (2018.01)
*G06F 9/38*    (2018.01)

(52) U.S. Cl.
CPC ........ *G06F 9/30043* (2013.01); *G06F 9/3824* (2013.01); *G06F 9/3826* (2013.01); *G06F 9/3832* (2013.01); *G06F 9/3834* (2013.01)

(58) Field of Classification Search
CPC .. G06F 9/3004; G06F 9/30145; G06F 12/023; G06F 2212/251; G06F 9/30043; G06F 9/3016; G06F 9/34; G06F 9/3832
See application file for complete search history.

(56) References Cited

U.S. PATENT DOCUMENTS

| | | | |
|---|---|---|---|
| 3,866,183 A | 2/1975 | Lange | |
| 5,390,318 A | 2/1995 | Ramakrishnan et al. | |
| 5,838,941 A * | 11/1998 | Valentine | G06F 9/384 712/216 |
| 5,911,057 A * | 6/1999 | Shiell | G06F 9/3824 712/217 |
| 6,470,444 B1 | 10/2002 | Sheaffer | |
| 6,463,522 B1 | 12/2002 | Akkary | |
| 7,085,914 B1 | 8/2006 | Gschwind | |
| 7,263,600 B2 * | 8/2007 | Sander | G06F 9/3826 712/218 |
| 7,779,236 B1 | 8/2010 | Isaman | |

(Continued)

FOREIGN PATENT DOCUMENTS

EP    1008050 B1    2/2007

OTHER PUBLICATIONS

Peng et al., "A New Address-Free Memory Hierarchy Layer for Zero-Cycle Load", The Journal of Instruction-Level Parallelism, vol. 6, 2004.*

(Continued)

*Primary Examiner* — Benjamin P Geib
(74) *Attorney, Agent, or Firm* — D. Kligler IP Services Ltd.

(57) ABSTRACT

A method includes, in a processor, processing program code that includes memory-access instructions, wherein at least some of the memory-access instructions include symbolic expressions that specify memory addresses in an external memory in terms of one or more register names. A relationship between the memory addresses accessed by two or more of the memory-access instructions is identified, based on respective formats of the memory addresses specified in the symbolic expressions. An outcome of at least one of the memory-access instructions is assigned to be served from an internal memory in the processor, based on the identified relationship.

30 Claims, 5 Drawing Sheets

(56) References Cited

U.S. PATENT DOCUMENTS

| | | | |
|---|---|---|---|
| 7,849,292 | B1 | 12/2010 | Ashcraft et al. |
| 8,452,946 | B2* | 5/2013 | Liu ..................... G06F 8/4442 |
| | | | 712/216 |
| 8,499,292 | B2 | 7/2013 | Ashcraft |
| 9,135,015 | B1 | 9/2015 | Mizrahi et al. |
| 2003/0196131 | A1 | 10/2003 | Imming et al. |
| 2003/0208660 | A1 | 11/2003 | Van De Waerdt |
| 2004/0015904 | A1 | 1/2004 | Jourdan et al. |
| 2005/0149702 | A1 | 7/2005 | Hily et al. |
| 2005/0251621 | A1 | 11/2005 | Theis |
| 2006/0242364 | A1 | 10/2006 | Chiba |
| 2007/0226418 | A1 | 9/2007 | Mizuno et al. |
| 2008/0177984 | A1 | 7/2008 | Lataille et al. |
| 2013/0326200 | A1 | 12/2013 | Kleen et al. |
| 2015/0046648 | A1 | 2/2015 | Anderson et al. |
| 2015/0121038 | A1 | 4/2015 | Dasika et al. |
| 2015/0154106 | A1 | 6/2015 | Pusdesris |
| 2015/0160998 | A1 | 6/2015 | Anvin et al. |
| 2016/0085443 | A1 | 3/2016 | Tomishima |

OTHER PUBLICATIONS

Peng et al., "Address-Free Memory Access Based on Program Syntax Correlation of Loads and Stores", IEEE, 2003.*
Ma et al., "Symbolic Cache: Fast Memory Access Based on Program Syntax Correlation of Loads and Stores", IEEE, 2001.*
Gonzalez et al., "Speculative Execution via Address Prediction and Data Prefetching", Departament d'Arquitectura de Computadors, Universitat Politècnica de Catalunya, Spain, 19 pages, year 2007.
Gonzalez et al., "Memory Address Prediction for Data Speculation", Lecture Notes in Computer Science, vol. 1300, pp. 1084-1091, Aug. 26-29, 1997.
Reinman et al., "Classifying Load and Store Instructions for Memory Renaming", Proceedings of the International Conference on Supercomputing, 10 pages, Jun. 1999.
Tyson et al.,"Memory Renaming: Fast, Early and Accurate Processing of Memory Communication", International Journal of Parallel Programming , vol. 27, No. 5, pp. 357-380, 1999.
Jourdan et al., "A Novel Renaming Scheme to Exploit Value Temporal Locality through Physical Register Reuse and Unification", Proceedings of the 31st Annual ACM/IEEE International Symposium on Microarchitecture (MICRO-31), pp. 216-225, Nov. 30-Dec. 2, 1998.
Austin et al., "Zero-Cycle Loads: Microarchitecture Support for Reducing Load Latency", Proceedings of the 28th Annual International Symposium on Microarchitecture, pp. 82-92, Nov. 29-Dec. 1, 1995.
Moshovos et al., "Streamlining Inter-operation Memory Communication via Data Dependence Prediction", Proceedings of the 30th Annual IEEE/ACM International Symposium on Microarchitecture, pp. 235-245, Dec. 1-3, 1997.
Moshovos et al., "Dynamic Speculation and Synchronization of Data Dependences", Proceedings of the 24th annual international symposium on Computer architecture, vol. 25, issue 2, pp. 181-193, May 1997.
Moshovos et al., "Memory Dependence Prediction in Multimedia Applications", Journal of Instruction-Level Parallelism, vol. 2, 18 pages, year 2000.
Moshovos et al., "Speculative Memory Cloaking and Bypassing", International Journal of Parallel Programming, vol. 27, issue 6, 15 pages, year 1999.
Mutlu, O., Memory Dependence Prediction and Access Ordering for Memory Disambiguation and Renaming, EE 382N Literature Survey, 16 pages, Sep. 10, 2001.
Bosah et al., "Memory Renaming", 29 pages, Oct. 20, 2003.
Mizrahi et al., U.S. Appl. No. 14/578,516, filed Dec. 22, 2014.
Mizrahi et al., U.S. Appl. No. 14/578,518, filed Dec. 22, 2014.
Mizrahi et al., U.S. Appl. No. 14/794,853, filed Jul. 9, 2015.
Mizrahi et al., U.S. Appl. No. 14/637,418, filed Mar. 4, 2015.
Mizrahi et al., U.S. Appl. No. 14/673,884, filed Mar. 31, 2015.
Mizrahi et al., U.S. Appl. No. 14/673,889, filed Mar. 31, 2015.
Mizrahi et al., U.S. Appl. No. 14/690,424, filed Apr. 19, 2015.
Mizrahi et al., U.S. Appl. No. 14/794,837, filed Jul. 9, 2015.
Mizrahi et al., U.S. Appl. No. 14/794,841, filed Jul. 9, 2015.
U.S. Appl. No. 14/794,837 Office Action dated Nov. 27, 2015.
International Application # PCT/IB2016/053999 dated Oct. 13, 2016.
U.S. Appl. No. 14/794,837 Office Action dated May 9, 2016.
U.S. Appl. No. 14/794,841 Office Action dated Mar. 2, 2017.
U.S. Appl. No. 14/794,853 Office Action dated Jun. 15, 2017.
U.S. Appl. No. 14/794,841 Office Action dated Aug. 4, 2017.

* cited by examiner

PROCESSOR WITH EFFICIENT MEMORY ACCESS

CROSS-REFERENCE TO RELATED APPLICATIONS

This application shares a common specification with U.S. patent application Ser. No. 14/794,837 "Processor with efficient processing of recurring load instructions from nearby memory addresses," U.S. patent application Ser. No. 14/794,841 "Processor with efficient processing of recurring load instructions," and U.S. patent application Ser. No. 14/794,853 "Processor with efficient processing of load-store instruction pairs," all filed on even date, whose disclosures are incorporated herein by reference.

FIELD OF THE INVENTION

The present invention relates generally to microprocessor design, and particularly to methods and systems for efficient memory access in microprocessors.

BACKGROUND OF THE INVENTION

One of the major bottlenecks that limit parallelization of code in microprocessors is dependency between memory-access instructions. Various techniques have been proposed to improve parallelization performance of code that includes memory access. For example, Tyson and Austin propose a technique referred to as "memory renaming," in "Memory Renaming: Fast, Early and Accurate Processing of Memory Communication," International Journal of Parallel Programming, Volume 27, No. 5, 1999, which is incorporated herein by reference. Memory renaming is a modification of the processor pipeline that applies register access techniques to load and store instructions to speed the processing of memory traffic. The approach works by predicting memory communication early in the pipeline, and then re-mapping the communication to fast physical registers.

SUMMARY OF THE INVENTION

An embodiment of the present invention that is described herein provides a method including, in a processor, processing program code that includes memory-access instructions, wherein at least some of the memory-access instructions include symbolic expressions that specify memory addresses in an external memory in terms of one or more register names. A relationship between the memory addresses accessed by two or more of the memory-access instructions is identified, based on respective formats of the memory addresses specified in the symbolic expressions. An outcome of at least one of the memory-access instructions is assigned to be served from an internal memory in the processor, based on the identified relationship.

In some embodiments, identifying the relationship between the memory addresses is independent of actual numerical values of the memory addresses. In an embodiment, identifying the relationship between the memory addresses is performed at a point in time at which the actual numerical values of the memory addresses are undefined. In a disclosed embodiment, identifying the relationship is performed by a given pipeline stage in a pipeline of the processor, and the actual numerical values of the memory addresses are calculated in another pipeline stage that is located later in the pipeline than the given pipeline stage.

In some embodiments, identifying the relationship includes searching the program code for memory-access instructions that specify the memory addresses using identical symbolic expressions. In an embodiment, identifying the relationship includes searching the program code for memory-access instructions that specify the memory addresses using different symbolic expressions that refer to the same memory address. In another embodiment, assigning the outcome of at least one of the memory-access instructions is performed by a decoding unit or a renaming unit in a pipeline of the processor.

In some embodiments, assigning the outcome to be served from the internal memory further includes executing a memory-access instruction in the external memory, and verifying that the outcome of the memory-access instruction executed in the external memory matches the outcome assigned to the memory-access instruction from the internal memory. In an embodiment, verifying the outcome includes comparing the outcome of the memory-access instruction executed in the external memory with the outcome assigned to the memory-access instruction from the internal memory. In another embodiment, verifying the outcome includes verifying that no intervening event causes a mismatch between the outcome in the external memory and the outcome assigned from the internal memory.

In yet another embodiment, verifying the outcome includes adding to the program code one or more instructions or micro-ops that verify the outcome, or modifying one or more existing instructions or micro-ops to the instructions or micro-ops that verify the outcome. In another embodiment, the method further includes flushing subsequent code upon finding that the outcome executed in the external memory does not match the outcome served from the internal memory.

In some embodiments, the method further includes inhibiting the at least one of the memory-access instructions from being executed in the external memory. In other embodiments, the method further includes parallelizing execution of the program code, including assignment of the outcome from the internal memory, over multiple hardware threads. In another embodiment, processing the program code includes executing the program code, including assignment of the outcome from the internal memory, in a single hardware thread.

In a disclosed embodiment, identifying the relationship includes identifying the memory-access instructions in a loop or a function. In another embodiment, identifying the relationship is performed at runtime. In an embodiment, identifying the relationship is performed, at least partly, based on indications embedded in the program code.

There is additionally provided, in accordance with an embodiment of the present invention, a processor including an internal memory and processing circuitry. The processing circuitry is configured to process program code that includes memory-access instructions, wherein at least some of the memory-access instructions include symbolic expressions that specify memory addresses in an external memory in terms of one or more register names, to identify a relationship between the memory addresses accessed by two or more of the memory-access instructions, based on respective formats of the memory addresses specified in the symbolic expressions, and to assign an outcome of at least one of the memory-access instructions to be served from the internal memory, based on the identified relationship.

The present invention will be more fully understood from the following detailed description of the embodiments thereof, taken together with the drawings in which:

DETAILED DESCRIPTION OF EMBODIMENTS

Overview

Figure 1:
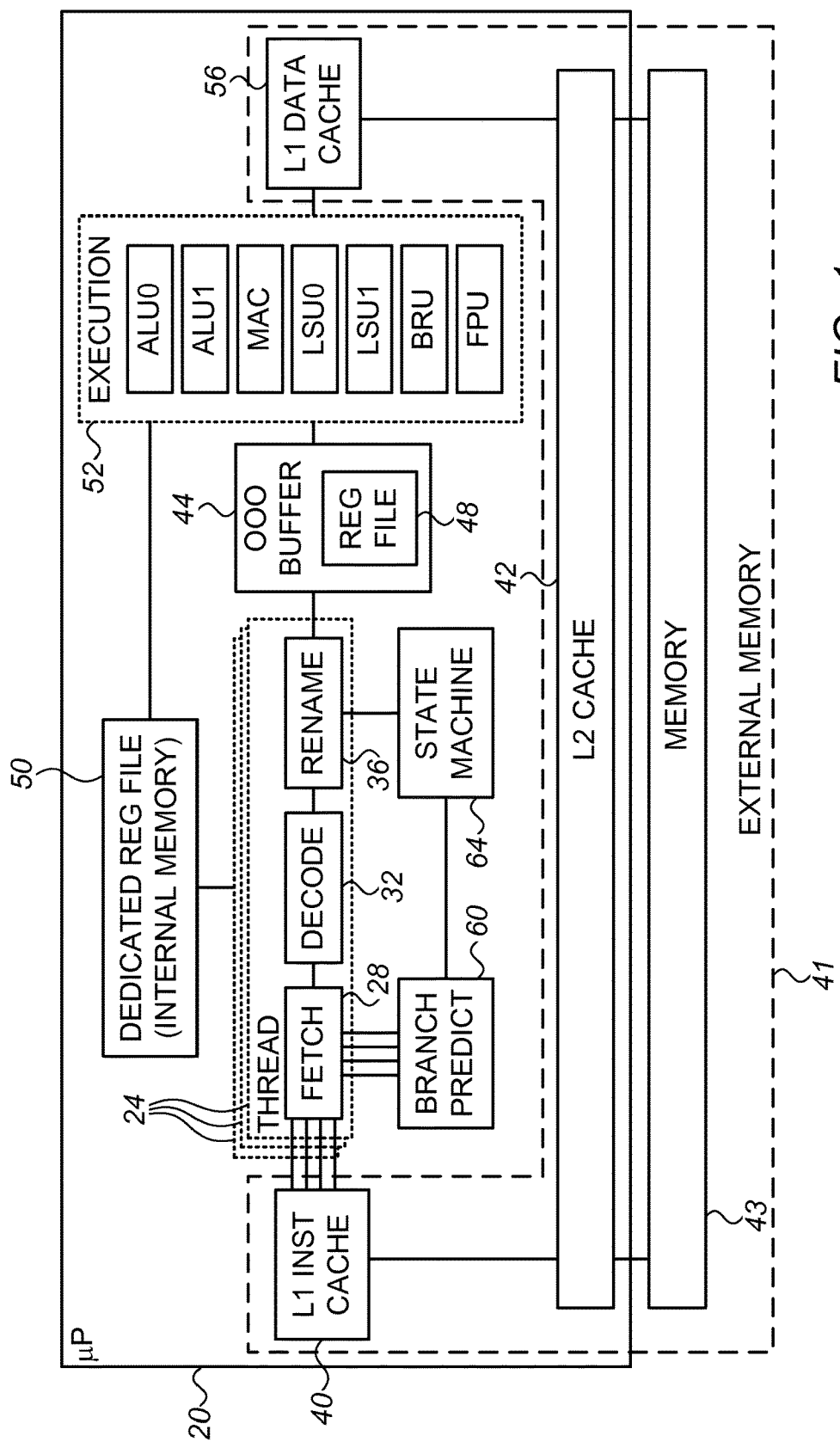
FIG. 1 is a block diagram that schematically illustrates a processor, in accordance with an embodiment of the present invention.

Embodiments of the present invention that are described herein provide improved methods and systems for processing software code that includes memory-access instructions. In the disclosed techniques, a processor monitors the code instructions, and finds relationships between memory-access instructions. Relationships may comprise, for example, multiple load instructions that access the same memory address, load and store instruction pairs that access the same memory address, or multiple load instructions that access a predictable pattern of memory addresses.

Based on the identified relationships, the processor is able to serve the outcomes of some memory-access instructions, to subsequent code that depends on the outcomes, from internal memory (e.g., internal registers, local buffer) instead of from external memory. In the present context, reading from the external memory via a cache, which is possibly internal to the processor, is also regarded as serving an instruction from the external memory.

In an example embodiment, when multiple load instructions read from the same memory address, the processor reads a value from this memory address on the first load instruction, and saves the value to an internal register. When processing the next load instructions, the processor serves the value to subsequent code from the internal register, without waiting for the load instruction to retrieve the value from the memory address. As a result, subsequent code that depends on the outcomes of the load instructions can be executed sooner, dependencies between instructions can be relaxed, and parallelization can be improved.

Typically, the next load instructions are still carried out in the external memory, e.g., in order to verify that the value served from the internal memory is still valid, but execution progress does not have to wait for them to complete. This feature improves performance since the dependencies of subsequent code on the load instructions are broken, and instruction parallelization can be improved.

In order to identify the relationships, it is possible in principle to wait until the numerical values of the memory addresses accessed by the memory-access instructions have been decoded, and then identify relationships between numerical values of decoded memory addresses. This solution, however, is costly in terms of latency because the actual numerical addresses accessed by the memory-access instructions are known only late in the pipeline.

Instead, in the embodiments described herein, the processor identifies the relationships between memory-access instructions based on the formats of the symbolic expressions that specify the memory addresses in the instructions, and not based on the actual numerical values of the addresses. The symbolic expressions are available early in the pipeline, as soon as the instructions are decoded. As a result, the disclosed techniques identify and act upon inter-related memory-access instructions with small latency, thus enabling fast operation and a high degree of parallelization.

Several examples of relationships between memory-access instructions, which can be identified and exploited, are described herein. Several schemes for handling the additional internal registers are also described, e.g., schemes that add micro-ops to the code and schemes that modify the conventional renaming of registers.

The disclosed techniques provide considerable performance improvements and are suitable for implementation in a wide variety of processor architectures, including both multi-thread and single-thread architectures.

System Description

FIG. 1 is a block diagram that schematically illustrates a processor 20, in accordance with an embodiment of the present invention. Processor 20 runs pre-compiled software code, while parallelizing the code execution. Instruction parallelization is performed by the processor at run-time, by analyzing the program instructions as they are fetched from memory and processed.

In the present example, processor 20 comprises multiple hardware threads 24 that are configured to operate in parallel. Each thread 24 is configured to process a respective segment of the code. Certain aspects of thread parallelization, including definitions and examples of partially repetitive segments, are addressed, for example, in U.S. patent application Ser. Nos. 14/578,516, 14/578,518, 14/583,119, 14/637,418, 14/673,884, 14/673,889 and 14/690,424, which are all assigned to the assignee of the present patent application and whose disclosures are incorporated herein by reference.

In the present embodiment, each thread 24 comprises a fetching unit 28, a decoding unit 32 and a renaming unit 36. Although some of the examples given below refer to instruction parallelization and to multi-thread architectures, the disclosed techniques are applicable and provide considerable performance improvements in single-thread processors, as well.

Fetching unit 24 fetch the program instructions of their respective code segments from a memory, e.g., from a multi-level instruction cache. In the present example, the multi-level instruction cache comprises a Level-1 (L1) instruction cache 40 and a Level-2 (L2) cache 42 that cache instructions stored in a memory 43. Decoding units 32 decode the fetched instructions (and possibly transform them into micro-ops), and renaming units 36 carry out register renaming.

The decoded instructions following renaming are buffered in an Out-of-Order (OOO) buffer 44 for out-of-order execution by multiple execution units 52, i.e., not in the order in which they have been compiled and stored in memory. The renaming units assign names (physical registers) to the operands and destination registers such that the OOO buffer issues (send for execution) instructions correctly based on availability of their operands. Alternatively, the buffered instructions may be executed in-order.

OOO buffer 44 comprises a register file 48. In some embodiments the processor further comprises a dedicated register file 50, also referred to herein as an internal memory. Register file 50 comprises one or more dedicated registers that are used for expediting memory-access instructions, as will be explained in detail below.

The instructions buffered in OOO buffer 44 are scheduled for execution by the various execution units 52. Instruction parallelization is typically achieved by issuing multiple (possibly out of order) instructions/micro-ops to the various execution units at the same time. In the present example, execution units 52 comprise two Arithmetic Logic Units (ALU) denoted ALU0 and ALU1, a Multiply-Accumulate (MAC) unit, two Load-Store Units (LSU) denoted LSU0 and LSU1, a Branch execution Unit (BRU) and a Floating-Point Unit (FPU). In alternative embodiments, execution units 52 may comprise any other suitable types of execution units, and/or any other suitable number of execution units of each type. The cascaded structure of threads 24, OOO buffer 44 and execution units 52 is referred to herein as the pipeline of processor 20.

The results produced by execution units 52 are saved in register file 48 and/or register file 50, and/or stored in memory 43. In some embodiments a multi-level data cache mediates between execution units 52 and memory 43. In the present example, the multi-level data cache comprises a Level-1 (L1) data cache 56 and L2 cache 42.

In some embodiments, the Load-Store Units (LSU) of processor 20 store data in memory 43 when executing store instructions, and retrieve data from memory 43 when executing load instructions. The data storage and/or retrieval operations may use the data cache (e.g., L1 cache 56 and L2 cache 42) for reducing memory access latency. In some embodiments, high-level cache (e.g., L2 cache) may be implemented, for example, as separate memory areas in the same physical memory, or simply share the same memory without fixed pre-allocation.

In the present context, memory 43, L1 cache 40 and 56, and L2 cache 42 are referred to collectively as an external memory 41. Any access to memory 43, cache 40, cache 56 or cache 42 is regarded as an access to the external memory. References to "addresses in the external memory" or "addresses in external memory 41" refer to the addresses of data in memory 43, even though the data may be physically retrieved by reading cached copies of the data in cache 56 or 42. By contrast, access to register file 50, for example, is regarded as access to internal memory.

A branch prediction unit 60 predicts branches or flow-control traces (multiple branches in a single prediction), referred to herein as "traces" for brevity, that are expected to be traversed by the program code during execution. The code may be executed in a single-thread processor or a single thread within a multi-thread processor, or by the various threads 24 as described in U.S. patent application Ser. Nos. 14/578,516, 14/578,518, 14/583,119, 14/637,418, 14/673,884, 14/673,889 and 14/690,424, cited above.

Based on the predictions, branch prediction unit 60 instructs fetching units 28 which new instructions are to be fetched from memory. Branch prediction in this context may predict entire traces for segments or for portions of segments, or predict the outcome of individual branch instructions. When parallelizing the code, e.g., as described in the above-cited patent applications, a state machine unit 64 manages the states of the various threads 24, and invokes threads to execute segments of code as appropriate.

In some embodiments, processor 20 parallelizes the processing of program code among threads 24. Among the various parallelization tasks, processor 20 performs efficient processing of memory-access instructions using methods that are described in detail below. Parallelization tasks are typically performed by various units of the processor. For example, branch prediction unit 60 typically predicts the control-flow traces for the various threads, state machine unit 64 invokes threads to execute appropriate segments at least partially in parallel, and renaming units 36 handle memory-access parallelization. In alternative embodiments, memory parallelization unit may be performed by decoding units 32, and/or jointly by decoding units 32 and renaming units 36.

Thus, in the context of the present disclosure and in the claims, units 60, 64, 32 and 36 are referred to collectively as thread parallelization circuitry (or simply parallelization circuitry for brevity). In alternative embodiments, the parallelization circuitry may comprise any other suitable subset of the units in processor 20. In some embodiments, some or even all of the functionality of the parallelization circuitry may be carried out using run-time software. Such run-time software is typically separate from the software code that is executed by the processor and may run, for example, on a separate processing core.

In the present context, register file 50 is referred to as internal memory, and the terms "internal memory" and "internal register" are sometimes used interchangeably. The remaining processor elements are referred to herein collectively as processing circuitry that carries out the disclosed techniques using the internal memory. Generally, other suitable types of internal memory can also be used for carrying out the disclosed techniques.

As noted already, although some of the examples described herein refer to multiple hardware threads and thread parallelization, many of the disclosed techniques can be implemented in a similar manner with a single hardware thread. The processor pipeline may comprise, for example, a single fetching unit 28, a single decoding unit 32, a single renaming unit 36, and no state machine 64. In such embodiments, the disclosed techniques accelerate memory access in single-thread processing. As such, although the examples below refer to memory-access acceleration functions being performed by the parallelization circuitry, these functions may generally be carried out by the processing circuitry of the processor.

The configuration of processor 20 shown in FIG. 1 is an example configuration that is chosen purely for the sake of conceptual clarity. In alternative embodiments, any other suitable processor configuration can be used. For example, in the configuration of FIG. 1, multi-threading is implemented using multiple fetching, decoding and renaming units. Additionally or alternatively, multi-threading may be implemented in many other ways, such as using multiple OOO buffers, separate execution units per thread and/or separate register files per thread. In another embodiment, different threads may comprise different respective processing cores.

As yet another example, the processor may be implemented without cache or with a different cache structure, without branch prediction or with a separate branch prediction per thread. The processor may comprise additional elements not shown in the figure. Further alternatively, the disclosed techniques can be carried out with processors having any other suitable micro-architecture.

Moreover, although the embodiments described herein refer mainly to parallelization of repetitive code, the disclosed techniques can be used to improve the processor performance, e.g., replace (and reduce) memory access time with register access time, reduce the number of external memory access operations, regardless of thread parallelization. Such techniques can be applied in single-thread configurations or other configurations that do not necessarily involve thread parallelization.

Processor 20 can be implemented using any suitable hardware, such as using one or more Application-Specific Integrated Circuits (ASICs), Field-Programmable Gate Arrays (FPGAs) or other device types. Additionally or alternatively, certain elements of processor 20 can be implemented using software, or using a combination of hardware and software elements. The instruction and data cache memories can be implemented using any suitable type of memory, such as Random Access Memory (RAM).

Processor 20 may be programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In some embodiments, the parallelization circuitry of processor 20 monitors the code processed by one or more threads 24, identifies code segments that are at least partially repetitive, and parallelizes execution of these code segments. Certain aspects of parallelization functions performed by the parallelization circuitry, including definitions and examples of partially repetitive segments, are addressed, for example, in U.S. patent application Ser. Nos. 14/578, 516, 14/578,518, 14/583,119, 14/637,418, 14/673,884, 14/673,889 and 14/690,424, cited above.

Early Detection of Relationships Between Memory-Access Instructions Based on Instruction Format Typically, the program code that is processed by processor 20 contains memory-access instructions such as load and store instructions. In many cases, different memory-access instructions in the code are inter-related, and these relationships can be exploited for improving performance. For example, different memory-access instructions may access the same memory address, or a predictable pattern of memory addresses. As another example, one memory-access instruction may read or write a certain value, subsequent instructions may manipulate that value in a predictable way, and a later memory-access instruction may then write the manipulated value to memory.

In some embodiments, the parallelization circuitry in processor 20 identifies such relationships between memory-access instructions, and uses the relationships to improve parallelization performance. In particular, the parallelization circuitry identifies the relationships by analyzing the formats of the symbolic expressions that specify the addresses accessed by the memory-access instructions (as opposed to the numerical values of the addresses).

Typically, the operand of a memory-access instruction (e.g., load or store instruction) comprises a symbolic expression, i.e., an expression defined in terms of one or more register names, specifying the memory-access operation to be performed. The symbolic expression of a memory-access instruction may specify, for example, the memory address to be accessed, a register whose value is to be written, or a register into which a value is to be read.

Depending on the instruction set defined in processor 20, the symbolic expressions may have a wide variety of formats. Different symbolic formats may relate to different addressing modes (e.g., direct vs. indirect addressing), or to pre-incrementing or post-incrementing of indices, to name just a few examples.

In a typical flow, decoding units 32 decode the instructions, including the symbolic expressions. At this stage, however, the actual numerical values of the expressions (e.g., numerical memory addresses to be accessed and/or numerical values to be written) are not yet known and possibly undefined. The symbolic expressions are typically evaluated later, by renaming units 36, just before the instructions are written to OOO buffer 44. Only at the execution stage, the LSUs and/or ALUs evaluate the symbolic expressions and assign the memory-access instructions actual numerical values.

In one example embodiment, the numerical memory addresses to be accessed is evaluated in the LSU and the numerical values to be written are evaluated in the ALU. In another example embodiment, both the numerical memory addresses to be accessed, and the numerical values to be written, are evaluated in the LSU.

It should be noted that the time delay between decoding an instruction (making the symbolic expression available) and evaluating the numerical values in the symbolic expression is not only due to the pipeline delay. In many practical scenarios, a symbolic expression of a given memory-access instruction cannot be evaluated (assigned numerical values) until the outcome of a previous instruction is available. Because of such dependencies, the symbolic expression may be available, in symbolic form, long before (possibly several tens of cycles before) it can be evaluated.

In some embodiments, the parallelization circuitry identifies and exploits the relationships between memory-access instructions by analyzing the formats of the symbolic expressions. As explained above, the relationships may be identified and exploited at a point in time at which the actual numerical values are still undefined and cannot be evaluated (e.g., because they depend on other instructions that were not yet executed). Since this process does not wait for the actual numerical values to be assigned, it can be performed early in the pipeline. As a result, subsequent code that depends on the outcomes of the memory-access instructions can be executed sooner, dependencies between instructions can be relaxed, and parallelization can thus be improved.

In some embodiments, the disclosed techniques are applied in regions of the code containing one or more code segments that are at least partially repetitive, e.g., loops or functions. Generally, however, the disclosed techniques can be applied in any other suitable region of the code, e.g., sections of loop iterations, sequential code and/or any other suitable instruction sequence, with a single or multi-threaded processor.

Figure 2:
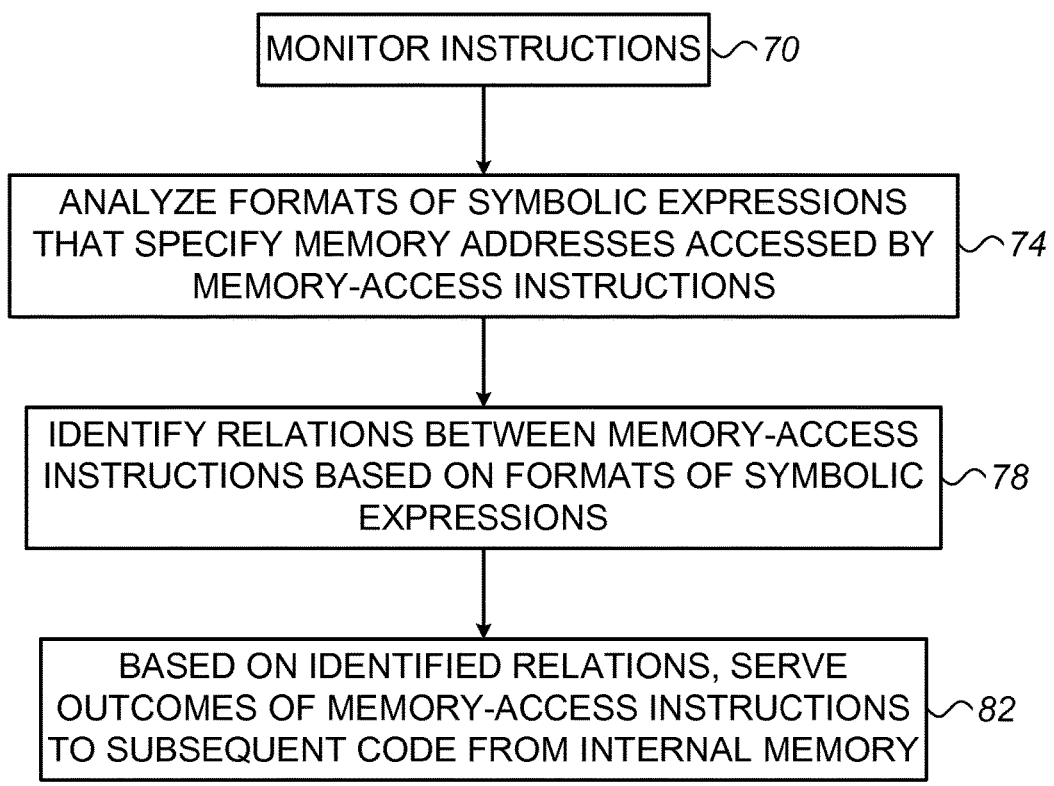
FIG. 2 is a flow chart that schematically illustrates a method for processing code that contains memory-access instructions, in accordance with an embodiment of the present invention.

FIG. 2 is a flow chart that schematically illustrates a method for processing code that contains memory-access instructions, in accordance with an embodiment of the present invention. The method begins with the parallelization circuitry in processor 20 monitoring code instructions, at a monitoring step 70. The parallelization circuitry analyzes the formats of the symbolic expressions of the monitored memory-access instructions, at a symbolic analysis step 74. In particular, the parallelization circuitry analyzes the parts of the symbolic expressions that specify the addresses to be accessed.

Based on the analyzed symbolic expressions, the parallelization circuitry identifies relationships between different memory-access instructions, at a relationship identification step 78. Based on the identified relationships, at a serving step 82, the parallelization circuitry serves the outcomes of at least some of the memory-access instructions from internal memory (e.g., internal registers of processor 20) instead of from external memory 41.

As noted above, the term "serving a memory-access instruction from external memory 41" covers the cases of serving a value that is stored in memory 43, or cached in cache 56 or 42. The term "serving a memory-access instruction from internal memory" refers to serving the value either directly or indirectly. One example of serving the value indirectly is copying the value to an internal register, and then serving the value from that internal register. Serving from the internal memory may be assigned, for example, by decoding unit 32 or renaming unit 36 of the relevant thread 24 and later performed by one of execution units 52.

The description that follows depicts several example relationships between memory-access instructions, and demonstrates how processor 20 accelerates memory access by identifying and exploiting these relationships. The code examples below are given using the ARM® instructions set, purely by way of example. In alternative embodiments, the disclosed techniques can be carried out using any other suitable instruction set.

Example Relationship: Load Instructions Accessing the Same Memory Address

In some embodiments, the parallelization circuitry identifies multiple load instructions (e.g., ldr instructions) that read from the same memory address in the external memory. The identification typically also includes verifying that no store instruction writes to this same memory address between the load instructions.

One example of such a scenario is a load instruction of the form ldr r1,[r6]

that is found inside a loop, wherein r6 is a global register. In the present context, the term "global register" refers to a register that is not written to between the various loads within the loop iterations (i.e., the register value does not change between loop iterations). The instruction above loads from memory the value which resides in the address which is held in r6 and puts it in r1.

In this embodiment, the parallelization circuitry analyzes the format of the symbolic expression of the address "[r6]", identifies that r6 is global, recognizes that the symbolic expression is defined in terms of one or more global registers, and concludes that the load instructions in the various loop iterations all read from the same address in the external memory.

The multiple load instructions that read from the same memory address need not necessarily occur within a loop. Consider, for example, the following code:

ldr r1,[r5,r2]
inst
inst
inst
ldr r3,[r5,r2]
inst
inst
ldr r3,[r5,r2]

In the example above, all three load instructions access the same memory address, assuming registers r5 and r2 are not written to between the load instructions. Note that, as in the above example, the destination registers of the various load instructions are not necessarily the same.

In the examples above, all the identified load instructions specify the address using the same symbolic expression. In alternative embodiments, the parallelization circuitry identifies load instructions that read from the same memory address, even though different load instructions may specify the memory address using different symbolic expressions. For example, the load instructions ldr r1,[r6,#4]!
ldr r1,[r6]
ldr r4,[r6]

all access the same memory address (in the first load the register r6 is first updated by adding 4 to its value). Another example for accessing the same memory address is repetitive load instructions such as:

ldr r1,[r6,#4]

or ldr r1,[r6,r4] (where r4 is also unchanged)

or ldr r1,[r6,r4 lsl #2]

The parallelization circuitry may recognize that these symbolic expressions all refer to the same address in various ways, e.g., by holding a predefined list of equivalent formats of symbolic expressions that specify the same address.

Upon identifying such a relationship, the parallelization circuitry saves the value read from the external memory by one of the load instructions in an internal register, e.g., in one of the dedicated registers in register file 50. For example, the processor parallelization circuitry may save the value read by the load instruction in the first loop iteration. When executing a subsequent load instruction, the parallelization circuitry may serve the outcome of the load instruction from the internal memory, without waiting for the value to be retrieved from the external memory. The value may be served from the internal memory to any subsequent code instructions that depend on this value.

In alternative embodiments, the parallelization circuitry may identify recurring load instructions not only in loops, but also in functions, in sections of loop iterations, in sequential code, and/or in any other suitable instruction sequence.

In various embodiments, processor 20 may implement the above mechanism in various ways. In one embodiment, the parallelization circuitry (typically decoding unit 32 or renaming unit 36 of the relevant thread) implements this mechanism by adding instructions or micro-ops to the code.

Consider, for example, a loop that contains (among other instructions) the three instructions ldr r1,[r6]
add r7,r6,r1
mov r1,r8 wherein r6 is a global register in this loop. The first instruction in this example loads a value from memory into r1, and the second instruction sums the value of r6 and r1 and puts it into r7. Note that the second instruction depends on the first. Further note that the value which was loaded from memory is "lost" in the third instruction which assigns the value of r8 to r1, and thus, there is a need to reload it from memory in each iteration. In an embodiment, upon identifying the relationship between the recurring ldr instructions, the parallelization circuitry adds an instruction of the form mov MSG,r1 after the ldr instruction in the first loop iteration, wherein MSG denotes a dedicated internal register. This instruction assigns the value which was loaded from memory in an additional register. The first loop iteration thus becomes

```
ldr r1,[r6]
mov MSG,r1
add r7,r6,r1
mov r1,r8
```

As a result, when executing the first loop iteration, the address specified by "[r6]" will be read from external memory and the read value will be saved in register MSG.

In the subsequent loop iterations, the parallelization circuitry adds an instruction of the form

```
mov r1,MSG
``` which assigns the value that was saved in the additional register to r1 after the ldr instruction. The subsequent loop iterations thus become

```
ldr r1,[r6]
mov r1,MSG
add r7,r6,r1
mov r8,r1
```

As a result, when executing the subsequent loop iterations, value of register MSG will be loaded into register r1 without having to wait for the ldr instruction to retrieve the value from external memory 41.

Since the mov instruction is an ALU instruction and does not involve accessing the external memory, it is considerably faster than the ldr instruction (typically a single cycle instead of four cycles). Furthermore, the add instruction no longer depends on the ldr instruction but only on the mov instruction and thus, the subsequent code benefits from the reduction in processing time.

In an alternative embodiment, the parallelization circuitry implements the above mechanism without adding instructions or micro-ops to the code, but rather by configuring the way registers are renamed in renaming units 36. Consider the example above, or a loop containing (among other instructions) the three instructions

```
ldr r1,[r6]
add r7,r6,r1
mov r1,r8
```

When processing the ldr instruction in the first loop iteration, renaming unit 36 performs conventional renaming, i.e., renames destination register r1 to some physical register (denoted p8 in this example), and serves the operand r1 in the add instruction from p8. When processing the mov instruction, r1 is renamed to a new physical register (e.g., p9). Unlike conventional renaming, p8 is not released when p9 is committed. The processor thus maintains the value of register p8 that holds the value loaded from memory.

When executing the subsequent loop iterations, on the other hand, renaming unit 36 applies a different renaming scheme. The operands r1 in the add instructions of all subsequent loop iterations all read the value from the same physical register p8, eliminating the need to wait for the result of the load instruction. Register p8 is released only after the last loop iteration.

Further alternatively, the parallelization circuitry may serve the read value from the internal register in any other suitable way. Typically, the internal register is dedicated for this purpose only. For example, the internal register may comprise one of the processor's architectural registers in register file 48 which is not exposed to the user. Alternatively, the internal register may comprise a register in register file 50, which is not one of the processor's architectural registers in register file 48 (like r6) or physical registers (like p8). Alternatively to saving the value in an internal register of the processor, any other suitable internal memory of the processor can be used for this purpose.

Serving the outcome of a ldr instruction from an internal register (e.g., MSG or p8), instead of from the actual content of the external memory address, involves a small but non-negligible probability of error. For example, if a different value were to be written to the memory address in question at any time after the first load instruction, then the actual read value will be different from the value saved in the internal register. As another example, if the value of register r6 were to be changed (even though it is assumed to be global), then the next load instruction will read from a different memory address. In this case, too, the actual read value will be different from the value saved in the internal register.

Thus, in some embodiments the parallelization circuitry verifies, after serving an outcome of a load instruction from an internal register, that the served value indeed matches the actual value retrieved by the load instruction from external memory 41. If a mismatch is found, the parallelization circuitry may flush subsequent instructions and results. Flushing typically comprises discarding all subsequent instructions from the pipeline such that all processing that was performed with a wrong operand value is discarded. In other words, the processor executes the subsequent load instructions in the external memory and retrieves the value from the memory address in question, for the purpose of verification, even though the value is served from the internal register.

The above verification may be performed, for example, by verifying that no store (e.g., str) instruction writes to the memory address between the recurring load instructions. Additionally or alternatively, the verification may ascertain that no fence instructions limit the possibility of serving subsequent code from the internal memory.

In some cases, however, the memory address in question may be written to by another entity, e.g., by another processor or processor core, or by a debugger. In such cases it may not be sufficient to verify that the monitored program code does not contain an intervening store instruction that writes to the memory address. In an embodiment, the verification may use an indication from a memory management subsystem, indicative of whether the content of the memory address was modified.

In the present context, intervening store instructions, intervening fence instructions, and/or indications from a memory management subsystems, are all regarded as intervening events that create a mismatch between the value in the external memory and the value served from the internal memory. The verification process may consider any of these events, and/or any other suitable intervening event.

In yet other embodiments, the parallelization circuitry may initially assume that no intervening event affects the memory address in question. If, during execution, some verification mechanism fails, the parallelization circuitry may deduce that an intervening event possibly exists, and refrain from serving the outcome from the internal memory.

As another example, the parallelization circuitry (typically decoding unit 32 or renaming unit 36) may add to the code an instruction or micro-op that retrieves the correct value from the external memory and compares it with the value of the internal register. The actual comparison may be performed, for example, by one of the ALUs or LSUs in execution units 52. Note that no instruction depends on the added micro-op, as it does not exist in the original code and is used only for verification. Further alternatively, the parallelization circuitry may perform the verification in any other suitable way. Note that this verification does not affect the performance benefit gained by the fast loading to register r1 when it is correct, but rather flushes this fast loading in cases where it was wrong.

Figure 3:
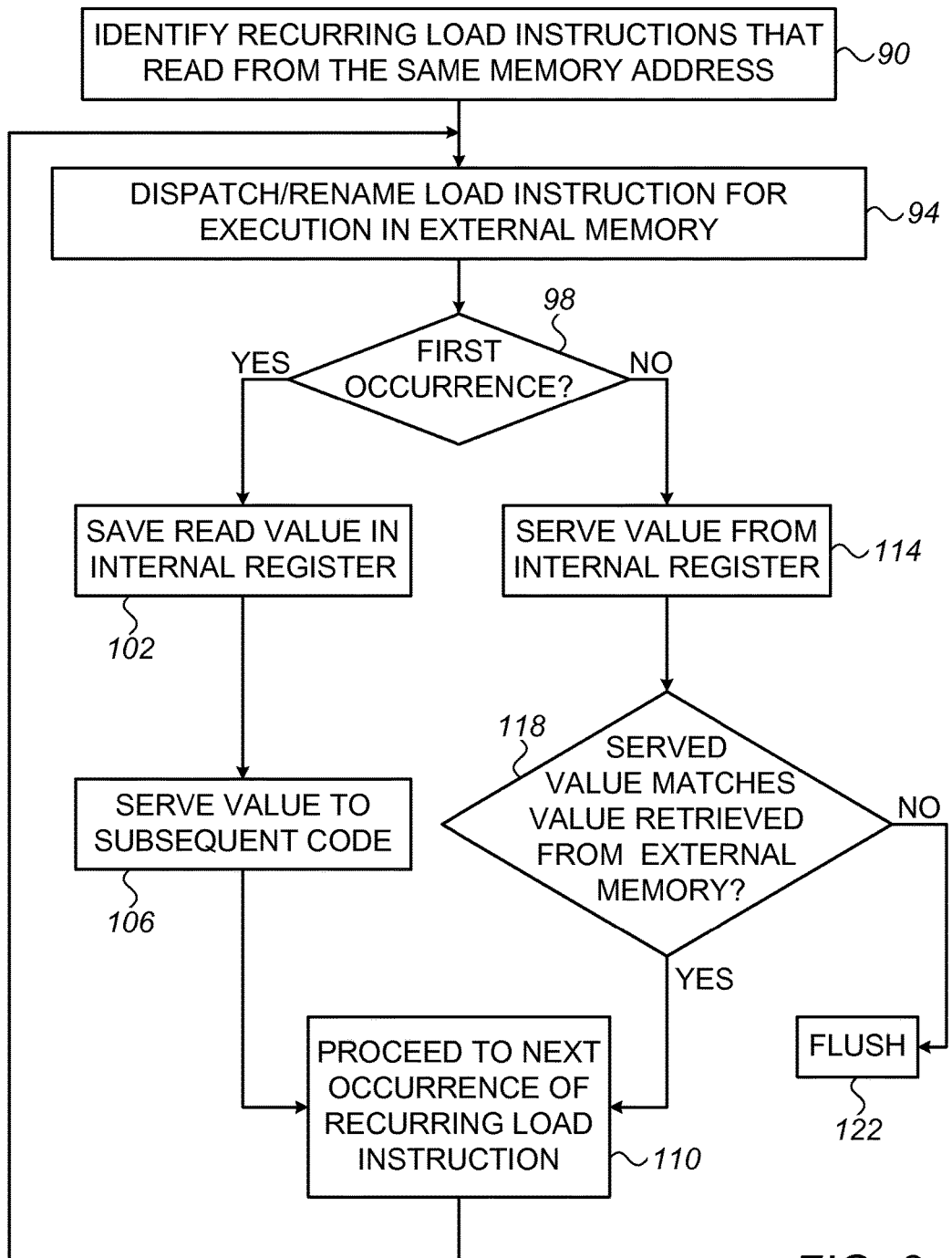
FIG. 3 is a flow chart that schematically illustrates a method for processing code that contains recurring load instructions, in accordance with an embodiment of the present invention.

FIG. 3 is a flow chart that schematically illustrates a method for processing code that contains recurring load instructions, in accordance with an embodiment of the present invention. The method begins with the parallelization circuitry of processor 20 identifying a recurring plurality of load instructions that access the same memory address (with no intervening event), at a recurring load identification step 90.

As explained above, this identification is made based on the formats of the symbolic expressions of the load instructions, and not based on the numerical values of the memory addresses. The identification may also consider and make use of factors such as the Program-Counter (PC) values, program addresses, instruction-indices and address-operands of the load instructions in the program code.

At a load execution step 94, processor 20 dispatches the next load instruction for execution in external memory 41. The parallelization circuitry checks whether the load instruction just executed is the first occurrence in the recurring load instructions, at a first occurrence checking step 98.

On the first occurrence, the parallelization circuitry saves the value read from the external memory in an internal register, at a saving step 102. The parallelization circuitry serves this value to subsequent code, at a serving step 106. The parallelization circuitry then proceeds to the next occurrence in the recurring load instructions, at an iteration incrementing step 110. The method then loops back to step 94, for executing the next load instruction. (Other instructions in the code are omitted from this flow for the sake of clarity.)

On subsequent occurrences of load instruction from the same address, the parallelization circuitry serves the outcome of the load instruction (or rather assigns the outcome to be served) from the internal register, at an internal serving step 114. Note that although step 114 appears after step 94 in the flow chart, the actual execution which relates to step 114 ends before the execution which is related to step 94.

At a verification step 118, the parallelization circuitry verifies whether the served value (the value saved in the internal register at step 102) is equal to the value retrieved from the external memory (retrieved at step 94 of the present iteration). If so, the method proceeds to step 110. If a mismatch is found, the parallelization circuitry flushes the subsequent instructions and/or results, at a flushing step 122.

In some embodiments, the recurring load instructions all recur in respective code segments having the same flow-control. For example, if a loop does not contain any conditional branch instructions, then all loop iterations, including load instructions, will traverse the same flow-control trace. If, on the other hand, the loop does contain one or more conditional branch instructions, then different loop iterations may traverse different flow-control traces. In such a case, a recurring load instruction may not necessarily recur in all possible traces.

In some embodiments, the parallelization circuitry serves the outcome of a recurring load instruction from the internal register only to subsequent code that is associated with the same flow-control trace as the initial load instruction (whose outcome was saved in the internal register). In this context, the traces considered by the parallelization circuitry may be actual traces traversed by the code, or predicted traces that are expected to be traversed. In the latter case, if the prediction fails, the subsequent code may be flushed. In alternative embodiments, the parallelization circuitry serves the outcome of a recurring load instruction from the internal register to subsequent code regardless of whether it is associated with the same trace or not.

For the sake of clarity, the above description referred to a single group of read instructions that read from the same memory address. In some embodiments, the parallelization circuitry may handle two or more groups of recurring read instructions, each reading from a respective common address. Such groups may be identified and handled in the same region of the code containing segments that are at least partially repetitive. For example, the parallelization circuitry may handle multiple dedicated registers (like the MSG register described above) for this purpose.

In some cases, the recurring load instruction is located at or near the end of a loop iteration, and the subsequent code that depends on the read value is located at or near the beginning of a loop iteration. In such a case, the parallelization circuitry may serve a value obtained in one loop iteration to a subsequent loop iteration. The iteration in which the value was initially read and the iteration to which the value is served may be processed by different threads 24 or by the same thread.

In some embodiments, the parallelization circuitry is able to recognize that multiple load instructions read from the same address even when the address is specified indirectly using a pointer value stored in memory. Consider, for example, the code ldr r3,[r4]
ldr r1,[r3,#4]
add r8,r1,r4
mov r3,r7
mov r1,r9 wherein r4 is global. In this example, the address [r4] holds a pointer. Nevertheless, the value of all loads to r1 (and r3) is the same in all iterations.

In some embodiments, the parallelization circuitry saves the information relating to the recurring load instructions as part of a data structure (referred to as a "scoreboard") produced by monitoring the relevant region of the code. Certain aspects of monitoring and scoreboard construction and usage are addressed, for example, in U.S. patent application Ser. Nos. 14/578,516, 14/578,518, 14/583,119, 14/637,418, 14/673,884, 14/673,889 and 14/690,424, cited above. In such a scoreboard, the parallelization circuitry may save, for example, the address format or PC value. Whenever reaching this code region, the parallelization circuitry (e.g., the renaming unit) may retrieve the information from the scoreboard and add micro-ops or change the renaming scheme accordingly.

Example Relationship: Load-Store Instruction Pairs Accessing the Same Memory Address In some embodiments, the parallelization circuitry identifies, based on the formats of the symbolic expressions, a store instruction and a subsequent load instruction that both access the same memory address in the external memory. Such a pair is referred to herein as a "load-store pair." The parallelization circuitry saves the value stored by the store instruction in an internal register, and serves (or at least assigns for serving) the outcome of the load instruction from the internal register, without waiting for the value to be retrieved from external memory 41. The value may be served from the internal register to any subsequent code instructions that depend on the outcome of the load instruction in the pair. The internal register may comprise, for example, one of the dedicated registers in register file 50.

The identification of load-store pairs and the decision whether to serve the outcome from an internal register may be performed, for example, by the relevant decoding unit 32 or renaming unit 36.

In some embodiments, both the load instruction and the store instruction specify the address using the same symbolic format, such as in the code str r1,[r2]
inst
inst
inst
ldr r8,[r2]

In other embodiments, the load instruction and the store instruction specify the address using different symbolic formats that nevertheless refer to the same memory address. Such load-store pairs may comprise, for example str r1,[r2,#4]! and ldr r8,[r2],
or
str r1,[r2],#4 and ldr r8,[r2,#-4]

In the first example (str r1,[r2,#4]!), the value of r2 is updated to increase by 4 before the store address is calculated. Thus, the store and load refer to the same address. In the second example (str r1,[r2],#4), the value of r2 is updated to increase by 4 after the store address is calculated, while the load address is then calculated from the new value of r2 subtracted by 4. Thus, in this example too, the store and load refer to the same address.

In some embodiments, the store and load instructions of a given load-store pair are processed by the same hardware thread 24. In alternative embodiments, the store and load instructions of a given load-store pair may be processed by different hardware threads.

As explained above with regard to recurring load instructions, in the case of load-store pairs too, the parallelization circuitry may serve the outcome of the load instruction from an internal register by adding an instruction or micro-op to the code. This instruction or micro-op may be added at any suitable location in the code in which the data for the store instruction is ready (not necessarily after the store instruction—possibly before the store instruction). Adding the instruction or micro-op may be performed, for example, by the relevant decoding unit 32 or renaming unit 36.

Consider, for example, the following code:

str r8, [r6]
inst
inst
inst
ldr r1,[r6],#1

The parallelization circuitry may add the micro-op mov MSGL,r8 that assigns the value of r8 into another register (which is referred to as MSGL) at a suitable location in which the value of r8 is available. Following the ldr instruction the parallelization circuitry may add the micro-op mov r1,MSGL that assigns the value of MSGL into register r1.

Alternatively, the parallelization circuitry may serve the outcome of the load instruction from an internal register by configuring the renaming scheme so that the outcome is served from the same physical register mapped by the store instruction. This operation, too, may be performed at any suitable time in which the data for the store instruction is already assigned to the final physical register, e.g., once the micro-op that assigns the value to r8 has passed the renaming unit. For example, renaming unit 36 may assign the value stored by the store instruction to a certain physical register, and rename the instructions that depend on the outcome of the corresponding load instruction to receive the outcome from this physical register.

In an embodiment, the parallelization circuitry verifies that the registers participating in the symbolic expression of the address in the store instruction are not updated between the store instruction and the load instruction of the pair.

In an embodiment, the store instruction stores a word of a certain width (e.g., a 32-bit word), and the corresponding load instruction loads a word of a different width (e.g., an 8-bit byte) that is contained within the stored word. For example, the store instruction may store a 32-bit word in a certain address, and the load instruction in the pair may load some 8-bit byte within the 32-bit word. This scenario is also regarded as a load-store pair that accesses the same memory address.

To qualify as a load-store pair, the symbolic expressions of the addresses in the store and load instructions need not necessarily use the same registers. The parallelization circuitry may pair a store instruction and a load instruction together, for example, even if their symbolic expressions use different registers but are known to have the same values.

In some embodiments, the registers in the symbolic expressions of the addresses in the store and load instructions are indices, i.e., their values increment with a certain stride or other fixed calculation so as to address an array in the external memory. For example, the load instruction and corresponding store instruction may be located inside a loop, such that each pair accesses an incrementally-increasing memory address.

In some embodiments, the parallelization circuitry verifies, when serving the outcome of the load instruction in a load-store pair from an internal register, that the served value indeed matches the actual value retrieved by the load instruction from external memory 41. If a mismatch is found, the parallelization circuitry may flush subsequent instructions and results.

Any suitable verification scheme can be used for this purpose. For example, as explained above with regard to recurring load instructions, the parallelization circuitry (e.g., the renaming unit) may add an instruction or micro-op that performs the verification. The actual comparison may be performed by the ALU or alternatively in the LSU. Alternatively, the parallelization circuitry may verify that the registers appearing in the symbolic expression of the address in the store instruction are not written to between the store instruction and the corresponding load instruction. Further alternatively, the parallelization circuitry may check for various other intervening events (e.g., fence instructions, or memory access by other entities) as explained above.

In some embodiments, the parallelization unit may inhibit the load instruction from being executed in the external memory. In an embodiment, instead of inhibiting the load instruction, the parallelization circuitry (e.g., the renaming unit) modifies the load instruction to an instruction or micro-op that performs the above-described verification.

In some embodiments, the parallelization circuitry serves the outcome of the load instruction in a load-store pair from the internal register only to subsequent code that is associated with a specific flow-control trace or traces in which the load-store pair was identified. For other traces, which may not comprise the load-store pair in question, the parallelization circuitry may execute the load instructions conventionally in the external memory.

In this context, the traces considered by the parallelization circuitry may be actual traces traversed by the code, or predicted traces that are expected to be traversed. In the latter case, if the prediction fails, the subsequent code may be flushed. In alternative embodiments, the parallelization circuitry serves the outcome of a load instruction from the internal register to subsequent code associated with any flow-control trace.

In some embodiments, the identification of the store or load instruction in the pair and the location for inserting micro-ops may also be based on factors such as the Program-Counter (PC) values, program addresses, instruction-indices and address-operands of the load and store instructions in the program code. For example, when the load-store pair is identified in a loop, the parallelization circuitry may save the PC value of the load instruction. This information indicates to the parallelization circuitry exactly where to insert the additional micro-op whenever the processor traverses this PC.

Figure 4:
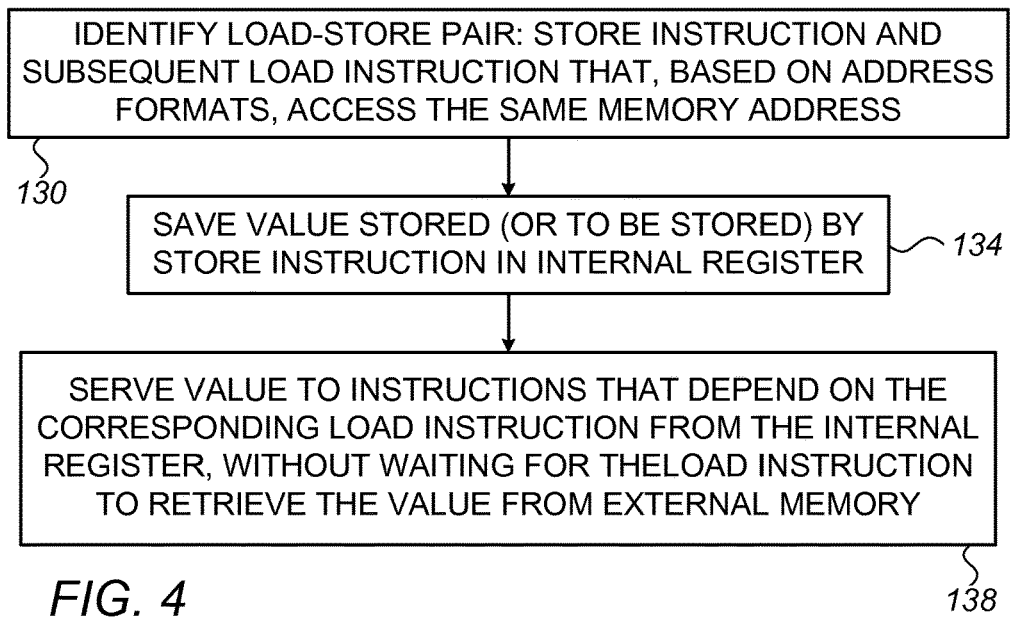
FIG. 4 is a flow chart that schematically illustrates a method for processing code that contains load-store instruction pairs, in accordance with an embodiment of the present invention.

FIG. 4 is a flow chart that schematically illustrates a method for processing code that contains load-store instruction pairs, in accordance with an embodiment of the present invention. The method begins with the parallelization circuitry identifying one or more load-store pairs that, based on the address format, access the same memory address, at a pair identification step 130.

For a given pair, the parallelization circuitry saves the value that is stored (or to be stored) by the store instruction in an internal register, at an internal saving step 134. At an internal serving step 138, the parallelization circuitry does not wait for the load instruction in the pair to retrieve the value from external memory. Instead, the parallelization circuitry serves the outcome of the load instruction, to any subsequent instructions that depend on this value, from the internal register.

The examples above refer to a single load-store pair in a given repetitive region of the code (e.g., loop). Generally, however, the parallelization circuitry may identify and handle two or more different load-store pairs in the same code region. Furthermore, multiple load instructions may be paired to the same store instruction. The parallelization circuitry may regard this scenario as multiple load store pairs, but assign the stored value to an internal register only once.

As explained above with regard to recurring load instructions, the parallelization circuitry may store the information on identification of load-store pairs in the scoreboard relating to the code region in question. In an alternative embodiment, the renaming unit may use the physical name of the register being stored as the operand of the registers to be loaded when the mov micro-op is added.

Example Relationship: Load-Store Instruction Pairs with Predictable Manipulation of the Stored Value As explained above, in some embodiments the parallelization circuitry identifies a region of the code containing one or more code segments that are at least partially repetitive, wherein the code in this region comprises repetitive load-store pairs. In some embodiments, the parallelization circuitry further identifies that the value loaded from external memory is manipulated using some predictable calculation between the load instructions of successive iterations (or, similarly, between the load instruction and the following store instruction in a given iteration).

These identifications are performed, e.g., by the relevant decoding unit 32 or renaming unit 36, based on the formats of the symbolic expressions of the instructions. As will be explained below, the repetitive load-store pairs need not necessarily access the same memory address.

In some embodiments, the parallelization circuitry saves the loaded value in an internal register or other internal memory, and manipulates the value using the same predictable calculation. The manipulated value is then assigned to be served to subsequent code that depends on the outcome of the next load instruction, without having to wait for the actual load instruction to retrieve the value from the external memory.

Consider, for example, a loop that contains the code

| A | ldr r1, [r6] |
| B | add r7, r6, r1 |
| C | inst |
| D | inst |
| E | ldr r8, [r6] |
| F | add r8, r8, #1 |
| G | str r8, [r6] | in which r6 is a global register. Instructions E-G increment a counter value that is stored in memory address "[r6]". Instructions A and B make use of the counter value that was set in the previous loop iteration. Between the load instruction and the store instruction, the program code manipulates the read value by some predictable manipulation (in the present example, incrementing by 1 in instruction F).

In the present example, instruction A depends on the value stored into "[r6]" by instruction G in the previous iteration. In some embodiments, the parallelization circuitry assigns the outcome of the load instruction (instruction A) to be served to subsequent code from an internal register (or other internal memory), without waiting for the value to be retrieved from external memory. The parallelization circuitry performs the same predictable manipulation on the internal register, so that the served value will be correct. When using this technique, instruction A still depends on instruction G in the previous iteration, but instructions that depend on the value read by instruction A can be processed earlier.

In one embodiment, in the first loop iteration the parallelization circuitry adds the micro-op
   mov MSI,r1
after instruction A or
   mov MSI,r8
after instruction E and before instruction F, wherein MSI denotes an internal register, such as one of the dedicated registers in register file 50. In the subsequent loop iterations, the parallelization circuitry adds the micro-op
   MSI,MSI, #1
at the beginning of the iteration, or at any other suitable location in the loop iteration before it is desired to make use of MSI. This micro-op increments the internal register MSI by 1, i.e., performs the same predictable manipulation of instruction F in the previous iteration. In addition, the parallelization circuitry adds the micro-op
   mov r1,MSI
(after the first increment micro-op was inserted) after each load instruction that accesses "[r6]" (after instructions A and E in the present example—note that after instruction E the micro-op mov r8,MSI would be added). As a result, any instruction that depends on these load instructions will be served from the internal register MSI instead of from the external memory. Adding the instructions or micro-ops above may be performed, for example, by the relevant decoding unit 32 or renaming unit 36.

In the above example, the parallelization circuitry performs the predictable manipulation once in each iteration, so as to serve the correct value to the code of the next iteration. In alternative embodiments, the parallelization circuitry may perform the predictable manipulation multiple times in a given iteration, and serve different predicted values to code of different subsequent iterations. In the counter incrementing example above, in the first iteration the parallelization circuitry may calculate the next n values of the counter, and provide the code of each iteration with the correct counter value. Any of these operations may be performed without waiting for the load instruction to retrieve the counter value from external memory. This advance calculation may be repeated every n iterations.

In an alternative embodiment, in the first iteration, the parallelization circuitry renames the destination register r1 (in instruction A) to a physical register denoted p8. The parallelization circuitry then adds one or more micro-ops or instructions (or modifies an existing micro-op, e.g., instruction A) to calculate a vector of n r8,r8,#1 values. The vector is saved in a set of dedicated registers $m_1 \ldots m_n$, e.g., in register file 50. In the subsequent iterations, the parallelization circuitry renames the operands of the add instructions (instruction D) to read from respective registers $m_1 \ldots m_n$ (according to the iteration number). The parallelization circuitry may comprise suitable vector-processing hardware for performing these vectors in a small number of cycles.

Figure 5:
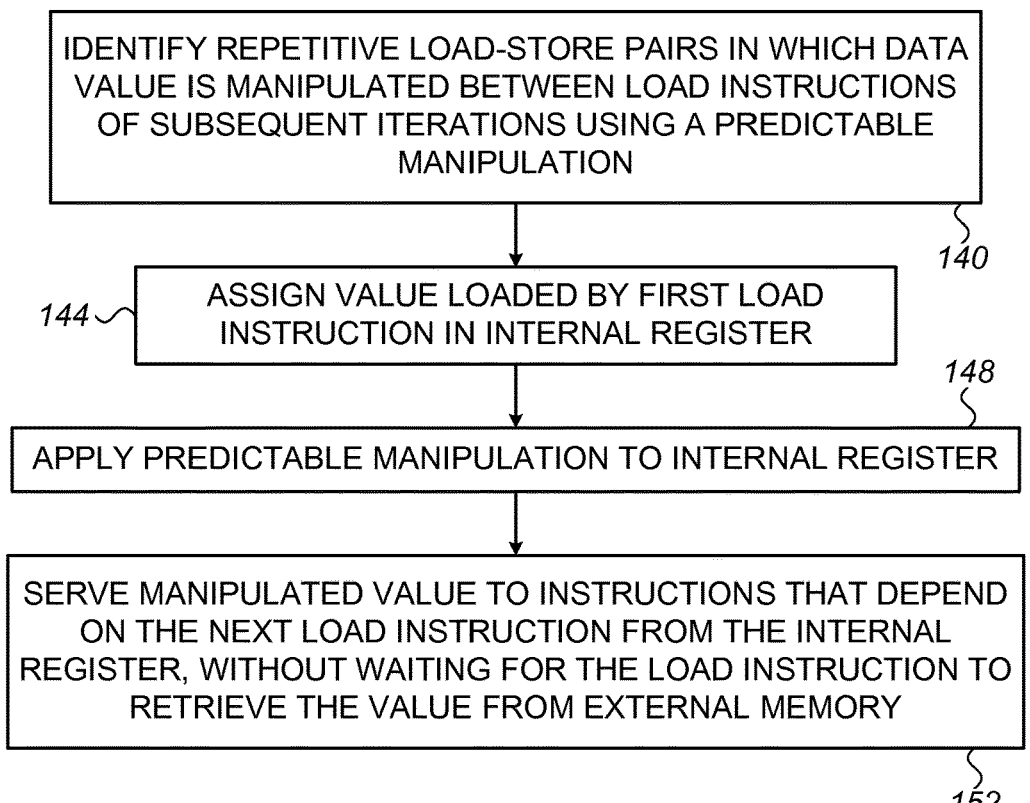
FIG. 5 is a flow chart that schematically illustrates a method for processing code that contains repetitive load-store instruction pairs with intervening data manipulation, in accordance with an embodiment of the present invention.

FIG. 5 is a flow chart that schematically illustrates a method for processing code that contains repetitive load-store instruction pairs with intervening data manipulation, in accordance with an embodiment of the present invention. The method begins with the parallelization circuitry identifying a code region containing repetitive load-store pairs having intervening data manipulation, at an identification step 140. The parallelization circuitry analyzes the code so as to identify both the load-store pairs and the data manipulation. The data manipulation typically comprises an operation performed by the ALU, or by another execution units such as an FPU or MAC unit. Typically although not necessarily, the manipulation is performed by a single instruction.

When the code region in question is a program loop, for example, each load-store pair typically comprises a store instruction in a given loop iteration and a load instruction in the next iteration that reads from the same memory address.

For a given load-store pair, the parallelization circuitry assigns the value that was loaded by a first load instruction in an internal register, at an internal saving step 144. At a manipulation step 148, the parallelization circuitry applies the same data manipulation (identified at step 140) to the internal register. The manipulation may be applied, for example, using the ALU, FPU or MAC unit.

At an internal serving step 152, the parallelization circuitry does not wait for the next load instruction to retrieve the manipulated value from external memory. Instead, the parallelization circuitry assigns the manipulated value (calculated at step 148) to any subsequent instructions that depend on the next load instruction, from the internal register.

In the examples above, the counter value is always stored in (and retrieved from) the same memory address ("[r6]", wherein r6 is a global register). This condition, however, is not mandatory. For example, each iteration may store the counter value in a different (e.g., incrementally increasing) address in external memory 41. In other words, within a given iteration the value may be loaded from a given address, manipulated and then stored in a different address.

A relationship still exists between the memory addresses accessed by the load and store instructions of different iterations: The load instruction in a given iteration accesses the same address as the store instruction of the previous iteration.

In an embodiment, the store instruction stores a word of a certain width (e.g., a 32-bit word), and the corresponding load instruction loads a word of a different width (e.g., an 8-bit byte) that is contained within the stored word. For example, the store instruction may store a 32-bit word in a certain address, and the load instruction in the pair may load some 8-bit byte within the 32-bit word. This scenario is also regarded as a load-store pair that accesses the same memory address. In such embodiments, the predictable manipulation should be applied to the smaller-size word loaded by the load instruction.

As in the previous examples, the parallelization circuitry typically verifies, when serving the manipulated value from the internal register, that the served value indeed matches the actual value after retrieval by the load instruction and manipulation. If a mismatch is found, the parallelization circuitry may flush subsequent instructions and results. Any suitable verification scheme can be used for this purpose, such as by adding one or more instructions or micro-ops, or by verifying that the address in the store instruction is not written to between the store instruction and the corresponding load instruction.

Further alternatively, the parallelization circuitry may check for various other intervening events (e.g., fence instructions, or memory access by other entities) as explained above.

Addition of instructions or micro-ops can be performed, for example, by the renaming unit. The actual comparison between the served value and the actual value may be performed by the ALU or LSU.

In some embodiments, the parallelization unit may inhibit the load instruction from being executed in the external memory. In an embodiment, instead of inhibiting the load instruction, the parallelization circuitry (e.g., the renaming unit) modifies the load instruction to an instruction or micro-op that performs the above-described verification.

In some embodiments, the parallelization circuitry serves the manipulated value from the internal register only to subsequent code that is associated with a specific flow-control trace or group of traces, e.g., only if the subsequent load-store pair is associated with the same flow-control trace as the current pair. In this context, the traces considered by the parallelization circuitry may be actual traces traversed by the code, or predicted traces that are expected to be traversed. In the latter case, if the prediction fails, the subsequent code may be flushed. In alternative embodiments, the parallelization circuitry serves the manipulated value from the internal register to subsequent code associated with any flow-control trace.

In some embodiments, the decision to serve the manipulated value from an internal register, and/or the identification of the location in the code for adding or manipulate micro-ops, may also consider factors such as the Program-Counter (PC) values, program addresses, instruction-indices and address-operands of the load and store instructions in the program code. The decision to serve the manipulated value from an internal register, and/or the identification of the code to which the manipulated value should be served, may be carried out, for example, by the relevant renaming or decoding unit.

The examples above refer to a single predictable manipulation and a single sequence of repetitive load-store pairs in a given region of the code (e.g., loop). Generally, however, the parallelization circuitry may identify and handle two or more different predictable manipulations, and/or two or more sequences of repetitive load-store pairs, in the same code region. Furthermore, as described above, multiple load instructions may be paired to the same store instruction. This scenario may be considered by the parallelization circuitry as multiple load-store pairs, wherein the stored value is assigned to an internal register only once.

As explained above, the parallelization circuitry may store the information on identification of load-store pairs and predictable manipulations in the scoreboard relating to the code region in question.

Example Relationship: Recurring Load Instructions that Access a Pattern of Nearby Memory Addresses In some embodiments, the parallelization circuitry identifies a region of the program code, which comprises a repetitive sequence of load instructions that access different but nearby memory addresses in external memory 41. Such a scenario occurs, for example, in a program loop that reads values from a vector or other array stored in the external memory, in accessing the stack, or in image processing or filtering applications.

In one embodiment, the load instructions in the sequence access incrementing adjacent memory addresses, e.g., in a loop that reads respective elements of a vector stored in the external memory. In another embodiment, the load instructions in the sequence access addresses that are not adjacent but differ from one another by a constant offset (sometimes referred to as "stride"). Such a case occurs, for example, in a loop that reads a particular column of an array.

Further alternatively, the load instructions in the sequence may access addresses that increment or decrement in accordance with any other suitable predictable pattern. Typically although not necessarily, the pattern is periodic. Another example of a periodic pattern, more complex than a stride, occurs when reading two or more columns of an array (e.g., matrix) stored in memory.

The above examples refer to program loops. Generally, however, the parallelization circuitry may identify any other region of code that comprises such repetitive load instructions, e.g., in sections of loop iterations, sequential code and/or any other suitable instruction sequence.

The parallelization circuitry identifies the sequence of repetitive load instructions, and the predictable pattern of the addresses being read from, based on the formats of the symbolic expressions that specify the addresses in the load instructions. The identification is thus performed early in the pipeline, e.g., by the relevant decoding unit or renaming unit.

Having identified the predictable pattern of addresses accessed by the load instruction sequence, the parallelization circuitry may access a plurality of the addresses in response to a given read instruction in the sequence, before the subsequent read instructions are processed. In some embodiments, in response to a given read instruction, the parallelization circuitry uses the identified pattern to read a plurality of future addresses in the sequence into internal registers (or other internal memory). The parallelization circuitry may then assign any of the read values from the internal memory to one or more future instructions that depend on the corresponding read instruction, without waiting for that read instruction to read the value from the external memory.

In some embodiments, the basic read operation performed by the LSUs reads a plurality of data values from a contiguous block of addresses in memory 43 (possibly via cache 56 or 42). This plurality of data values is sometimes referred to as a "cache line." A cache line may comprise, for example, sixty-four bytes, and a single data value may comprise, for example four or eight bytes, although any other suitable cache-line size can be used. Typically, the LSU or cache reads an entire cache line regardless of the actual number of values that were requested, even when requested to read a single data value from a single address.

In some embodiments, the LSU or cache reads a cache line in response to a given read instruction in the above-described sequence. Depending on the pattern of addresses, the cache line may also contain one or more data values that will be accessed by one or more subsequent read instructions in the sequence (in addition to the data value requested by the given read instruction). In an embodiment, the parallelization circuitry extracts the multiple data values from the cache line based on the pattern of addresses, saves them in internal registers, and serves them to the appropriate future instructions.

Thus, in the present context, the term "nearby addresses" means addresses that are close to one another relative to the cache-line size. If, for example, each cache line comprises n data values, the parallelization circuitry may repeat the above process every n read instructions in the sequence.

Furthermore, if the parallelization circuitry, LSU or cache identifies that in order to load n data values from memory there is a need to get another cache line, it may initiate a read from memory of the relevant cache line. Alternatively, instead of reading the next cache line into the LSU, it is possible to set a prefetch trigger based on the identification and the pattern, for reading the data to L1 cache 56.

This technique is especially effective when a single cache line comprises many data values that will be requested by future read instructions in the sequence (e.g., when a single cache line comprises many periods of the pattern). The performance benefit is also considerable when the read instructions in the sequence arrive in execution units 52 at large intervals, e.g., when they are separated by many other instructions.

Figure 6:
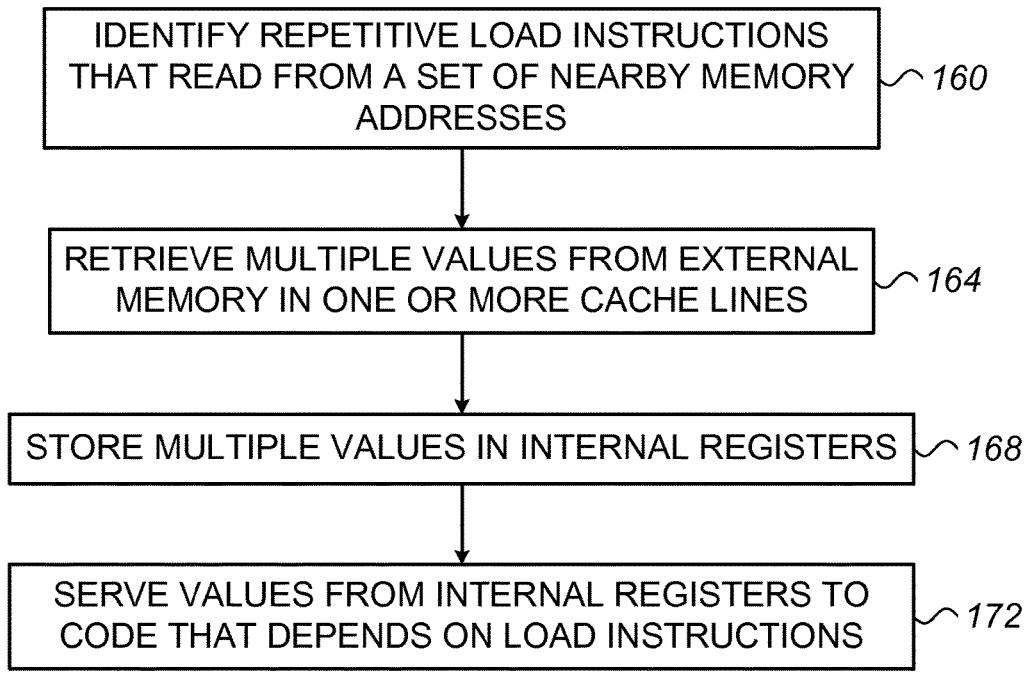
FIG. 6 is a flow chart that schematically illustrates a method for processing code that contains recurring load instructions from nearby memory addresses, in accordance with an embodiment of the present invention.

FIG. 6 is a flow chart that schematically illustrates a method for processing code that contains recurring load instructions from nearby memory addresses, in accordance with an embodiment of the present invention. The method begins at a sequence identification step 160, with the parallelization circuitry identifying a repetitive sequence of read instructions that access respective memory addresses in memory 43 in accordance with a predictable pattern.

In response to a given read instruction in the sequence, an LSU in execution units 52 (or the cache) reads one or several cache lines from memory 43 (possibly via cache 56 or 42), at a cache-line readout step 164. At an extraction step 168, the parallelization circuitry extracts the data value requested by the given read instruction from the cache line. In addition, the parallelization circuitry uses the identified pattern of addresses to extract from the cache lines one or more data values that will be requested by one or more subsequent read instructions in the sequence. For example, if the pattern indicates that the read instructions access every fourth address starting from some base address, the parallelization circuitry may extract every fourth data value from the cache lines.

As an internal storage step 168, the parallelization circuitry saves the extracted data values in internal memory. The extracted data values may be saved, for example, in a set of internal registers in register file 50. The other data in the cache lines may be discarded. In other embodiments, the parallelization circuitry may copy the entire cache lines to the internal memory, and later assign the appropriate values from the internal memory in accordance with the pattern.

At a serving step 172, the parallelization circuitry serves the data values from the internal registers to the subsequent code instructions that depend on them. For example, the $k^{th}$ extracted data value may be served to any instruction that depends on the outcome of the $k^{th}$ read instruction following the given read instruction. The $k^{th}$ extracted data value may be served from the internal memory without waiting for the $k^{th}$ read instruction to retrieve the data value from external memory.

Consider, for example, a loop that contains the following code:

ldr r1,[r6],#4
    add r7,r6,r1 wherein r6 is a global register. This loop reads data values from every fourth address, starting from some base address that is initialized at the beginning of the loop. As explained above, the parallelization circuitry may identify the code region containing this loop, identify the predictable pattern of addresses, and then extract and serve multiple data values from a retrieved cache line.

In some embodiments, this mechanism is implemented by adding one or more instructions or micro-ops to the code, or modifying existing one or more instructions or micro-ops, e.g., by the relevant renaming unit 36.

Referring to the example above, in an embodiment, in the first loop iteration the parallelization circuitry modifies the load (ldr) instruction to vec_ldr MA,r1 wherein MA denotes a set of internal registers, e.g., in register file 50.

In subsequent loop iterations, the parallelization circuitry adds the following instruction after the ldr instruction:

mov r1,MA(iteration_number)

The vec_ldr instruction in the first loop iteration saves multiple retrieved values to the MA registers, and the mov instruction in the subsequent iterations assigns the values from the MA registers to register r1 with no direct relationship to the ldr instruction. This allows the subsequent add instruction to be issued/executed without waiting for the ldr instruction to complete.

In an alternative embodiment, the parallelization circuitry (e.g., renaming unit 36) implements the above mechanism by proper setting of the renaming scheme. Referring to the example above, in an embodiment, in the first loop iteration the parallelization circuitry modifies the load (ldr) instruction to vec_ldr MA,r1

In the subsequent loop iterations, the parallelization circuitry renames the operands of the add instructions to read from MA(iteration_num) even though the new ldr destination is renamed to a different physical register. In addition, the parallelization circuitry does not release the mapping of the MA registers in a conventional manner, i.e., on the next time the write to r1 is committed. Instead, the mapping is retained until all data values extracted from the current cache line have been served.

In the two examples above, the parallelization circuitry may use a series of ldr micro-ops instead of the ldr_vec instruction.

For a given pattern of addresses, each cache line contains a given number of data values. If the number of loop iterations is larger than the number of data values per cache line, or if one of the loads crosses the cache-line boundary (e.g., because since the loads are not necessarily aligned with the beginning of a cache line), then a new cache line should be read when the current cache line is exhausted. In some embodiments, the parallelization circuitry automatically instructs the LSU to read a next cache line.

Other non-limiting examples of repetitive load instructions that access predictable nearby address patterns may comprise:

ldr r2,[r5,r1] wherein r1 is an index
or
    ldr r2,[r1,#4]!
or
    ldr r2, [r1],#4
or
    ldr r3,[r8,sl,lsl #2] wherein sl is an index or an example of an unrolled loop:
    ldr r1,[r5,#4]
    ldr r1,[r5,#8]
    ldr r1,[r5,#12]
    . . . .

In some embodiments, all the load instructions in the sequence are processed by the same hardware thread 24 (e.g., when processing an unrolled loop, or when the processor is a single-thread processor). In alternative embodiments, the load instructions in the sequence may be processed by at least two different hardware threads.

In some embodiments, the parallelization circuitry verifies, when serving the outcome of a load instruction in the sequence from the internal memory, that the served value indeed matches the actual value retrieved by the load instruction from external memory. If a mismatch is found, the parallelization circuitry may flush subsequent instructions and results. Any suitable verification scheme can be used for this purpose. For example, as explained above, the parallelization circuitry (e.g., the renaming unit) may add an instruction or micro-op that performs the verification. The actual comparison may be performed by the ALU or alternatively in the LSU.

As explained above, the parallelization circuitry may also verify, e.g., based on the formats of the symbolic expressions of the instructions, that no intervening event causes a mismatch between the served values and the actual values in the external memory.

In yet other embodiments, the parallelization circuitry may initially assume that no intervening event affects the memory address in question. If, during execution, some verification mechanism fails, the parallelization circuitry may deduce that an intervening event possibly exists, and refrain from serving the outcome from the internal memory.

In some embodiments, the parallelization unit may inhibit the load instruction from being executed in the external memory. In an embodiment, instead of inhibiting the load instruction, the parallelization circuitry (e.g., the renaming unit) modifies the load instruction to an instruction or micro-op that performs the above-described verification.

In some embodiments, the parallelization circuitry serves the outcome of a load instruction from the internal memory only to subsequent code that is associated with one or more specific flow-control traces (e.g., traces that contain the load instruction). In this context, the traces considered by the parallelization circuitry may be actual traces traversed by the code, or predicted traces that are expected to be traversed. In the latter case, if the prediction fails, the subsequent code may be flushed. In alternative embodiments, the parallelization circuitry serves the outcome of a load instruction from the internal register to subsequent code associated with any flow-control trace.

In some embodiments, the decision to assign the outcome from an internal register, and/or the identification of the locations in the code for adding or modifying instructions or micro-ops, may also consider factors such as the Program-Counter (PC) values, program addresses, instruction-indices and address-operands of the load instructions in the program code.

In some embodiments, the MA registers may reside in a register file having characteristics and requirements that differ from other registers of the processor. For example, this register file may have a dedicated write port buffer from the LSU, and only read ports from the other execution units 52.

The examples above refer to a single sequence of load instructions that access a single predictable pattern of memory addresses in a region of the code. Generally, however, the parallelization circuitry may identify and handle in the same code region two or more different sequences of load instructions, which access two or more respective patterns of memory addresses.

As explained above, the parallelization circuitry may store the information on identification of the sequence of load instructions, and on the predictable pattern of memory addresses, in the scoreboard relating to the code region in question.

In the examples given in FIGS. 2-6 above, the relationships between memory-access instructions and the resulting actions, e.g., adding or modifying instructions or micro-ops, are performed at runtime. In alternative embodiments, however, at least some of these functions may be performed by a compiler that compiles the program code for execution by processor 20. Thus, in some embodiments, processor 20 identifies and acts upon the relationships between memory-access instructions, at partially based on hints or other indications embedded in the program code by the compiler.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
in a processor, processing program code that includes memory-access instructions using a pipeline that comprises at least a decoding unit that transforms the memory-access instructions into micro-ops, and execution units including one or more Load-Store Units (LSUs) that execute the micro-ops, wherein at least some of the memory-access instructions comprise symbolic expressions that specify memory addresses in an external memory in terms of one or more register names;
identifying, using hardware-implemented processing circuitry in the processor, at runtime, a relationship between the memory addresses accessed by two or more of the memory-access instructions, based on respective formats of the memory addresses specified in the symbolic expressions;
transforming the program code into micro-ops to be executed by the one or more execution units of the pipeline, including, for a memory-access instruction for which the relationship was identified and which originally specified that the one or more LSUs are to access the external memory, adding new micro-ops to the code at runtime:
(i) on a given occurrence of the memory-access instruction, adding a first type of micro-op that instructs the same one or more LSUs, which are used for processing the program code other than the added micro-ops, to write an outcome of the memory-access instruction into an internal memory of the processor; and
(ii) on subsequent occurrences of the memory-access instruction, adding a second type of micro-op that instructs the same one or more LSUs, which are used for processing the program code other than the added micro-ops, to access an internal memory of the processor instead of the external memory; and
assigning the outcome of the subsequent occurrences of the memory-access instruction to be served from the internal memory, by processing the second type of micro-op in the pipeline using the same one or more LSUs used for processing the program code other than the added micro-ops.

2. The method according to claim 1, wherein identifying the relationship between the memory addresses is independent of actual numerical values of the memory addresses.

3. The method according to claim 2, wherein identifying the relationship between the memory addresses is performed at a point in time at which the actual numerical values of the memory addresses are undefined.

4. The method according to claim 2, wherein identifying the relationship is performed by a given pipeline stage in the pipeline of the processor, and wherein the actual numerical values of the memory addresses are calculated in another pipeline stage that is located later in the pipeline than the given pipeline stage.

5. The method according to claim 1, wherein identifying the relationship comprises searching the program code for memory-access instructions that specify the memory addresses using identical symbolic expressions.

6. The method according to claim 1, wherein identifying the relationship comprises searching the program code for memory-access instructions that specify the memory addresses using different symbolic expressions that refer to the same memory address.

7. The method according to claim 1, wherein assigning the outcome is performed by a decoding unit or a renaming unit in the pipeline of the processor.

8. The method according to claim 1, wherein assigning the outcome to be served from the internal memory further comprises:
executing the memory-access instruction in the external memory; and
verifying that the outcome of the memory-access instruction executed in the external memory matches the outcome assigned to the memory-access instruction from the internal memory.

9. The method according to claim 8, wherein verifying the outcome comprises comparing the outcome of the memory-access instruction executed in the external memory with the outcome assigned to the memory-access instruction from the internal memory.

10. The method according to claim 8, wherein verifying the outcome comprises verifying that no intervening event causes a mismatch between the outcome in the external memory and the outcome assigned from the internal memory.

11. The method according to claim 8, wherein verifying the outcome comprises adding to the program code one or more instructions or micro-ops that verify the outcome, or modifying one or more existing instructions or micro-ops to the instructions or micro-ops that verify the outcome.

12. The method according to claim 8, further comprising flushing subsequent code upon finding that the outcome executed in the external memory does not match the outcome served from the internal memory.

13. The method according to claim 1, further comprising inhibiting at least one of the memory-access instructions from being executed in the external memory.

14. The method according to claim 1, further comprising parallelizing execution of the program code, including assignment of the outcome from the internal memory, over multiple hardware threads.

15. The method according to claim 1, wherein processing the program code comprises executing the program code, including assignment of the outcome from the internal memory, in a single hardware thread.

16. The method according to claim 1, wherein identifying the relationship comprises identifying the memory-access instructions in a loop or a function.

17. The method according to claim 1, wherein identifying the relationship is performed at runtime.

18. The method according to claim 1, wherein identifying the relationship is performed, at least partly, based on indications embedded in the program code.

19. A processor, comprising:
an internal memory; and
hardware-implemented processing circuitry, which is configured to:
process program code that includes memory-access instructions using a pipeline that comprises at least a decoding unit that transforms the memory-access instructions into micro-ops, and execution units including one or more Load-Store Units (LSUs) that execute the micro-ops, wherein at least some of the memory-access instructions comprise symbolic expressions that specify memory addresses in an external memory in terms of one or more register names,
identify, using the hardware-implemented processing circuitry in the processor, at runtime, a relationship between the memory addresses accessed by two or more of the memory-access instructions, based on respective formats of the memory addresses specified in the symbolic expressions,
transform the program code into micro-ops to be executed by the one or more execution units of the pipeline, including, for a memory-access instruction for which the relationship was identified and which originally specified that the one or more LSUs are to access the external memory, adding new micro-ops to the code at runtime:
(i) on a given occurrence of the memory-access instruction, adding a first type of micro-op that instructs the same one or more LSUs, which are used for processing the program code other than the added micro-ops, to write an outcome of the memory-access instruction into an internal memory of the processor; and
(ii) on subsequent occurrences of the memory-access instruction, adding a second type of micro-op that instructs the same one or more LSUs, which are used for processing the program code other than the added micro-ops, to access an internal memory of the processor instead of the external memory, and
assign the outcome of the subsequent occurrences of the memory-access instruction to be served from the internal memory, by processing the second type of micro-op in the pipeline using the same one or more LSUs used for processing the program code other than the added micro-ops.

20. The processor according to claim 19, wherein the processing circuitry is configured to identify the relationship between the memory addresses independently of actual numerical values of the memory addresses.

21. The processor according to claim 20, wherein the processing circuitry is configured to identify the relationship between the memory addresses at a point in time at which the actual numerical values of the memory addresses are undefined.

22. The processor according to claim 20, wherein the processing circuitry is configured to identify the relationship in a given pipeline stage in the pipeline of the processor, and to calculate the actual numerical values of the memory addresses in another pipeline stage that is located later in the pipeline than the given pipeline stage.

23. The processor according to claim 19, wherein the processing circuitry is configured to identify the relationship by searching the program code for memory-access instructions that specify the memory addresses using identical symbolic expressions.

24. The processor according to claim 19, wherein the processing circuitry is configured to identify the relationship by searching the program code for memory-access instructions that specify the memory addresses using different symbolic expressions that refer to the same memory address.

25. The processor according to claim 19, wherein the processing circuitry is configured to assign the outcome by a decoding unit or a renaming unit in the pipeline of the processor.

26. The processor according to claim 19, wherein the processing circuitry is configured to assign the outcome to be served from the internal memory by:
executing the memory-access instruction in the external memory; and
verifying that the outcome of the memory-access instruction executed in the external memory matches the outcome assigned to the memory-access instruction from the internal memory.

27. The processor according to claim 26, wherein the processing circuitry is configured to verify the outcome by comparing the outcome of the memory-access instruction executed in the external memory with the outcome assigned to the memory-access instruction from the internal memory.

28. The processor according to claim 26, wherein the processing circuitry is configured to verify the outcome by verifying that no intervening event causes a mismatch between the outcome in the external memory and the outcome assigned from the internal memory.

29. The processor according to claim 26, wherein the processing circuitry is configured to add to the program code an instruction or micro-op that verifies the outcome, or to modify an existing instruction or micro-op to the instruction or micro-op that verifies the outcome.

30. The processor according to claim 19, wherein the processing circuitry is configured to inhibit at least one of the memory-access instructions from being executed in the external memory.

* * * * *